(12) United States Patent
Palm

(10) Patent No.: US 6,332,396 B1
(45) Date of Patent: Dec. 25, 2001

(54) APPARATUS IN AN INFUSOR FOR A LIQUID FOOD PRODUCT

(75) Inventor: Bengt Palm, Genarp (SE)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 09/601,621

(22) PCT Filed: Feb. 5, 1999

(86) PCT No.: PCT/SE99/00161

§ 371 Date: Sep. 28, 2000

§ 102(e) Date: Sep. 28, 2000

(87) PCT Pub. No.: WO99/39593

PCT Pub. Date: Aug. 12, 1999

(30) Foreign Application Priority Data

Feb. 6, 1998 (SE) .................................... 9800352

(51) Int. Cl.$^7$ ....................................... A23C 3/02
(52) U.S. Cl. ................... 99/453; 99/483; 99/516; 422/307; 422/26
(58) Field of Search ................... 99/453, 452, 483, 99/516, 534, 467, 470, 471, 473, 474, 475, 476; 422/26, 307; 426/520, 521, 522, 511, 392, 394, 399, 406, 407; 239/419, 422, 423, 424, 432, 518

(56) References Cited

U.S. PATENT DOCUMENTS

| | | | |
|---|---|---|---|
| 4,776,268 | * 10/1988 | Bronnert | 99/453 |
| 4,787,304 | 11/1988 | Bronnert | 99/453 |
| 4,851,250 | 7/1989 | Bronnert | 426/511 |
| 5,092,230 | * 3/1992 | Bronnert | 99/453 |
| 5,292,543 | * 3/1994 | Heath et al. | 426/506 |

FOREIGN PATENT DOCUMENTS

21722/88    2/1989   (AU).

* cited by examiner

*Primary Examiner*—Reginald L. Alexander
(74) *Attorney, Agent, or Firm*—Burns, Doane, Swecker & Mathis, L.L.P.

(57) ABSTRACT

The invention relates to an apparatus in an infuser. The infuser is of the type which has an autoclave, with an inlet in its upper region for the product which is to be heated, and an outlet located in its lower region for the ready-treated product. The inlet is provided with a distributor chamber which divides the product into small droplets when the product enters the autoclave. The infuser is also provided with at least one temperature gauge placed in the upper region of the autoclave. The temperature gauge is disposed to control a valve for the uncondensable gases which gather in the "cold" area which is formed in the upper region of the autoclave, as a result of the placing of the steam inlet in the lower region of the autoclave.

4 Claims, 2 Drawing Sheets

APPARATUS IN AN INFUSOR FOR A LIQUID FOOD PRODUCT

TECHNICAL FIELD

Figure 1:
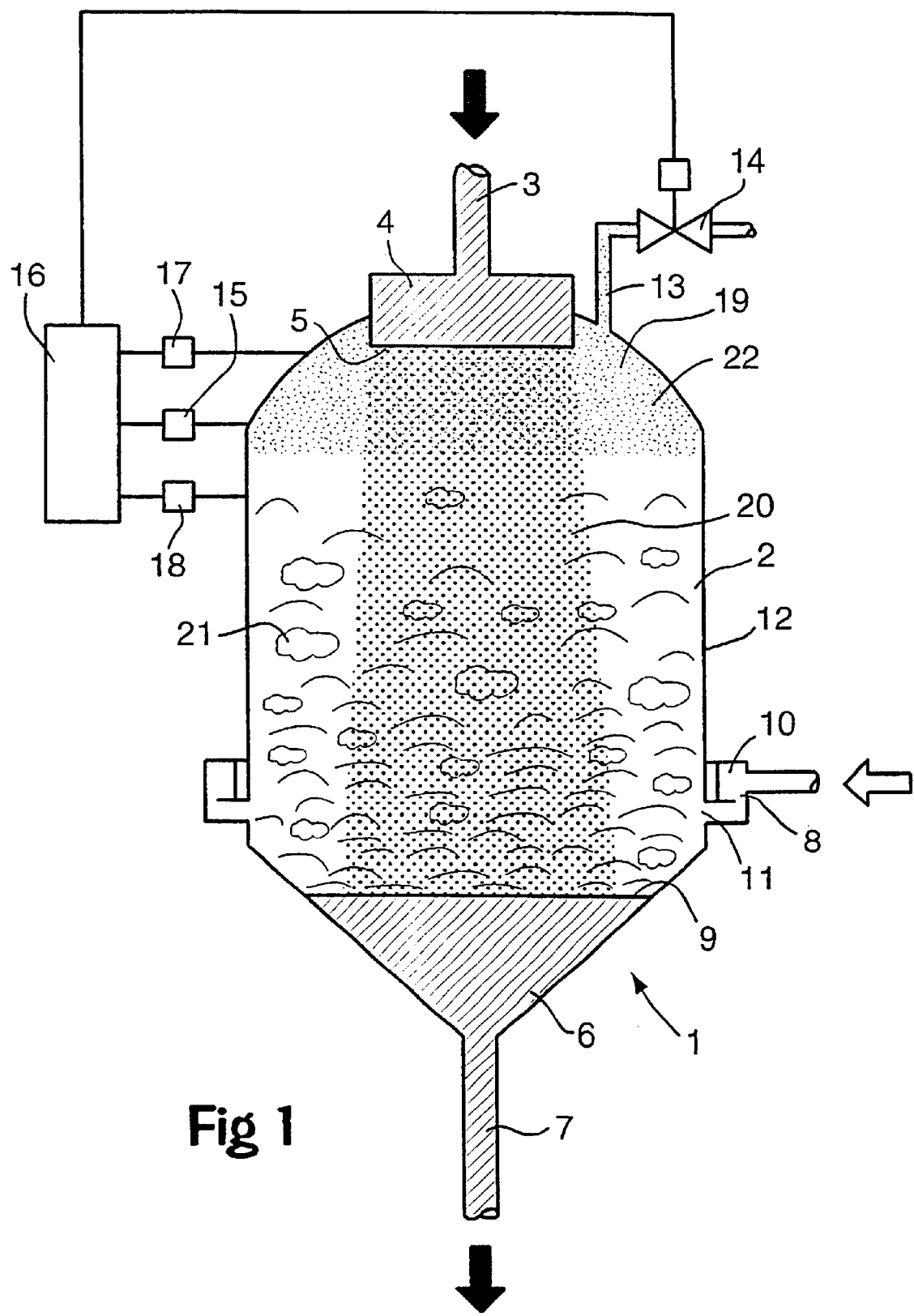

The present invention relates to an apparatus in an infusor for a liquid food product, the apparatus being of the type which includes an autoclave with an inlet for the product located in its upper region, the inlet being arranged to divide the product entering the autoclave into small droplets, the infusor further including an inlet for steam located in the lower region of the autoclave and also an outlet located in the upper region for uncondensable gases.

BACKGROUND ART

Heat-treating food products for increased shelf life is a well-known and often-employed method. For example, the food product may be various dairy produce such as milk, cream or yoghurt. The heat treatment may take place in a plurality of ways, either directly or indirectly. Indirect methods are, for instance, heating by means of different types of heat exchangers. Of the direct methods, there are two major groups, injection or infusion with steam. By employing a direct method, an extremely rapid heating will be obtained which today is to be sought after since, in order to improve the flavour properties of, for example, milk, it is often the intention to heat to elevated temperatures for brief periods of time.

The present invention relates to an apparatus which employs infusion heating. Infusion entails that a finely-divided liquid is heated in a steam chamber. The principle of heating a liquid, for example a liquid food, by injecting the food into a chamber filled with steam has been known since the early part of the nineteenth century.

The first infusion heating plants were based on the same principle as condensers with which surplus steam from various chemical processes was condensed. The earlier plants thus displayed an infusor which consisted of an autoclave with an inlet for product in the upper region of the autoclave. The inlet discharged in a distributor chamber which divided the incoming product into small, fine liquid droplets. In the bottom of the autoclave there is an outlet for the heated product. The autoclave was further provided with an inlet for steam which, in these early infusors, was located in the lower region of the autoclave.

The first infusors with their steam inlet placed in the lower region of the autoclave thereby automatically obtained a "colder" area in the upper regions of the autoclave. In this "colder" area of the infusor, the uncondensable gases which the product always contains gathers naturally. The uncondensable gases may, for example, be oxygen, nitrogen and carbon dioxide, and these are emitted in connection with the product being heated. A minor quantity of the gases may also come from the steam employed in the process. By obtaining a natural gathering of the gases with a very slight admixture of steam, it is thus easy to lead them off by means of an outlet placed in the upper region of the autoclave.

But since these early infusors suffered from another drawback, this concept was abandoned. The drawback was that when such infusors were used, for example for milk, the steam which, at a low level in the autoclave, is injected in towards the finely-divided liquid droplets caused the droplets to change direction and many of the droplets became stuck to the hot inner walls in the infusor, where burning of the product to such walls was the immediate outcome. The burning of product onto the walls entails major hygienic problems and such burnt product is extremely difficult to wash off.

In order to obviate the problem of burning of the product on the inner walls of the infusor, the steam inlet was placed in the upper region of the infusor. The steam was supplied from above, over the distributor chamber of the product, so that the droplets are not disrupted in the fall down through the steam chamber. But the admission of steam concurrently with the admission of product also suffers from its drawbacks. This type of steam admission may give rise to burning of the product around or in the distributor apertures or distributor gaps displayed by the distributor chamber. This disrupts the heating of the product, the temperature of the product falls, whereupon the steam pressure must be increased and higher temperature differences will occur between product and steam. By designing the distributor apertures such that they have a very thin edge out towards the steam chamber, it is possible to solve the problem in that there will be very thin burnt product layers which are easily broken off before they become disruptive.

But the concurrent admission of steam also resulted in it not being possible to create the "cold" area in the upper region of the autoclave. The uncondensable gases have no natural point of collection. The uncondensable gases may also readily remain trapped in pockets in the downwardly flowing steam and there very readily occurs admixture of steam into the uncondensable gases. This gives a considerably poorer degree of heating of the product, which must be compensated for by an unnecessarily high steam pressure and greater temperature difference between steam and product. The consumption of steam in the process will also be considerably higher, since it is difficult to separate the steam and the uncondensable gases on discharge of the gases.

OBJECTS OF THE INVENTION

One object of the present invention is, by combining a steam inlet which is placed low with a temperature gauge which controls the discharge of the uncondensable gases, to obtain a natural separation of gases and steam and an automatic discharge of these gases.

A further object of the present invention is to reduce steam consumption in the process, since steam and uncondensable gases are not intermixed as easily.

SOLUTION

These and other objects have been attained according to the present invention in that the apparatus of the type described by way of introduction has been given the characterizing features that the infusor has at least one temperature gauge placed in the upper region of the autoclave, the pressure gauge being, via a temperature regulator, disposed to control an outlet valve for the uncondensable gases.

Preferred embodiments of the present invention have further been given the characterizing features as set forth in the appended subclaims.

BRIEF DESCRIPTION OF THE ACCOMPANYING DRAWINGS

Figure 2:
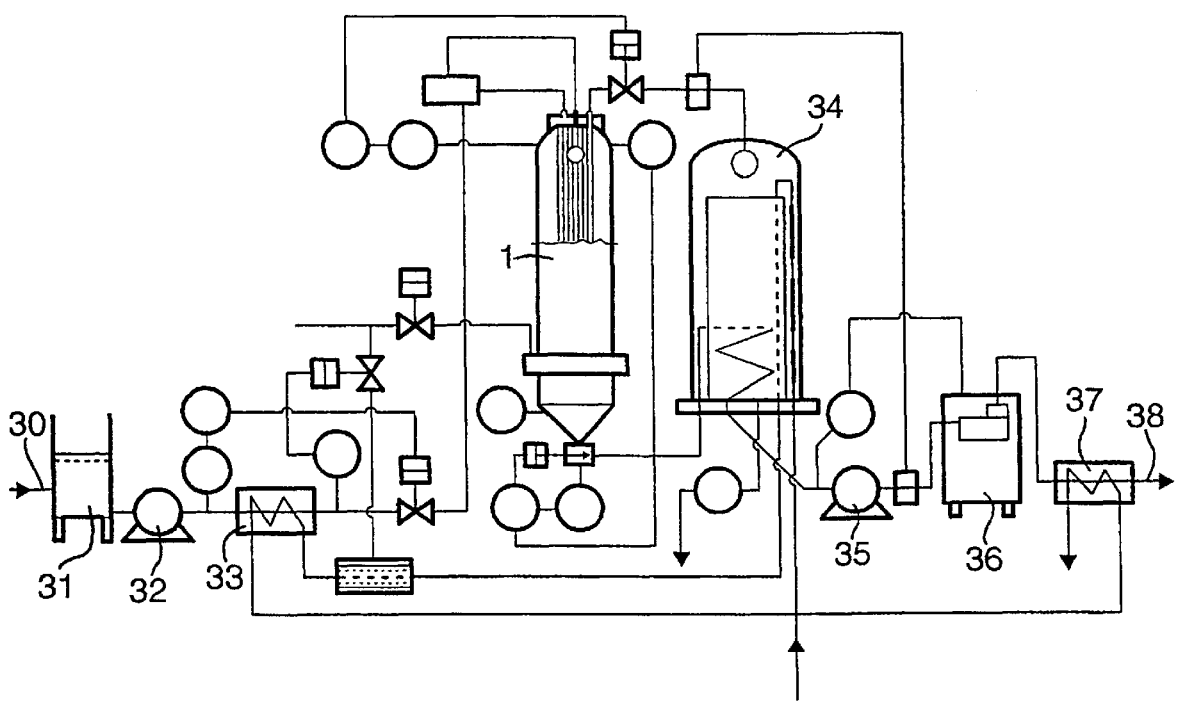

One preferred embodiment of the present invention will now be described in greater detail hereinbelow, with reference to the accompanying Drawings, in which:

FIG. 1 is a side elevation, partly in section, of an infusor according to the present invention; and FIG. 2 is a flow diagram of a plant for beat treatment by means of infusion heat.

The Drawings show only those parts and details essential to an understanding of the present invention.

DESCRIPTION OF PREFERRED EMBODIMENT

FIG. 1 shows, in side elevation, an infusor 1 according to the present invention. The infusor 1 consists substantially of a conventional autoclave 2. In its upper region, the autoclave 2 has an inlet 3 for the product which is to be heat treated in the infusor 1. The product inlet 3 terminates with a distributor chamber 4. The distributor chamber 4 is centrally placed in the autoclave and has, on its lower wall 5, a large number of apertures or gaps. The apertures or gaps are intended to finely divide the incoming product so that the product, when it enters the autoclave 2, forms a large number of small, fine droplets 20 which fall down through the autoclave 2.

In the lower, preferably lowermost, region of the autoclave 2, where the autoclave 2 forms a conical termination 6, there is disposed an outlet 7 for the product which has been heat treated in the infusor 1. The lower region of the conical termination 6 of the autoclave 2 functions as a retainer cell where the product stays for a certain period of time before being pumped further for additional treatment.

Furthermore, the infusor 1 is, in the lower region of the autoclave 2, provided with an inlet 8 for steam 21. The steam inlet 8 is placed far down in the autoclave 2, preferably above the conical termination 6 of the autoclave 2 and a distance from the liquid surface 9 which is formed by the heat treated product, when the product stays in the autoclave 2 at a certain temperature and before it leaves the autoclave 2. The steam inlet 8 is, via an insulated distributor chamber 10, connected to a concentric aperture 11 provided in the casing surface 12 of the autoclave 2.

In the upper region of the autoclave 2, there is disposed an outlet 13 for uncondensable gases. The outlet 13 is provided with a controllable valve 14. In the upper region of the autoclave 2, there is also placed at least one temperature gauge 15, which, via a temperature regulator 16, controls the outlet valve 14. In the preferred embodiment, the autoclave 2 is provided with an additional two temperature gauges 17, 18, preferably placed such that one gauge 17 is located on a higher level than the gauge 15, and the other gauge 18 is on a lower level than the gauge 15.

The incoming product entering the infusor 1 is pumped through a conduit to the inlet 3 to the upper region of the autoclave 2. The incoming product (which may, for example, consist of milk) is normally at a temperature of 75–82° C., but in certain applications up to 120° C. From the inlet 3 and the distributor chamber 4, the product passes through a large number of apertures or gaps provided in the lower wall 5 of the distributor chamber 4. The product thereby forms a large number of small droplets 20 which fall freely down through the autoclave 2 until they reach the liquid surface 9. On their way down through the autoclave 2, the product droplets 20 meet pressurized steam 21 which is at a temperature of approx. 120–170° C., preferably 140–150° C.

By condensation of the steam, the steam 21 rapidly heats the product droplets 20 to the desired temperature and when the droplets 20 reach the liquid surface 9, the product has attained the desired temperature. The distance between the distributor chamber 4 for product and the liquid surface 9 should be so great that the product droplets 20 have time to be heated to the desired temperature. The ready-heated product will, for a certain period of time, stay in the conical termination 6 of the autoclave 2 before leaving the infusor 1 through the outlet 7.

As a result of the admission of steam 21 concentrically in the autoclave 2, there will be obtained a very uniform distribution of the steam 21 within the autoclave 2 and there is very little risk that the inflowing steam 21 disrupts the product droplets 20. In that the product droplets 20 may fall relatively straight down without disruption, product spattering on the hot inner walls of the autoclave 2 is reduced to a minimum, and thereby the burning of product on the walls of the autoclave is also reduced.

During the heating process, uncondensable gases 22, such as oxygen, nitrogen and carbon dioxide, are released from the product. A certain quantity of uncondensable gases 22 also comes from the steam 21 which is employed in the process. In that the infusor 1 has a steam inlet 8 placed in the lower region of the autoclave 2, there will naturally be obtained a "cold" area 19 in the upper regions of the autoclave 2. The uncondensable gases 22 quite naturally gather in this "cold" area 19, with a very slight admixture of steam 21 from the process. The "cold" area prevents the apertures or gaps in the lower wall 5 of the distributor chamber 4 from being heated by steam at elevated temperature and the burning of product in the apertures or gaps—or on the lower wall 5—of the distributor chamber 4 is thereby avoided.

The temperature regulator 16 is given a norm value which exceeds the temperature of the incoming product by a few degrees. When the temperature gauge 15 reads off this norm value, a signal passes to the controllable outlet valve 14. The valve 14 opens and the uncondensable gases 22 are evacuated. In order to obtain a suitably large "cold" area 19, the preferred embodiment calls for the employment of a further two temperature gauges 17, 18, which in principle function as maximum and minimum temperature guards, respectively. The "cold" area 19 should not be allowed to extend downwards in the autoclave 2, since this may have a harmful effect on the heating of the product. Nor should the "cold" area shrink to such a slight volume that the natural gathering of the uncondensable gases 22 is not realised. Alternatively, only gauges 15, 17 may be employed, where the first gauge 15 regulates the valve 14 and the second gauge 17 functions either as a maximum temperature guard or as a minimum temperature guard, depending on where it is placed in relation to the first gauge 15.

FIG. 2 shows how an infusor 1 is included as a part in a plant for the heat treatment of a liquid food product by means of infusion heat. The incoming product 30 passes via a balance tank 31 and a pump 32. In a heat exchanger 33, for example a plate heat exchanger, the product is pre-heated to the desired temperature, normally of the order of 75–82° C., but temperatures of up to 120° C. may occur. The thus heated product is led in a conduit to the infusor 1 and is heat treated there using the above-described method.

The ready-treated product is led from the infusor 1 to an expansion vessel 34 where the excess of water which the product has obtained as a result of the infusion heating is once again removed. Via a pump 35 and possibly a homogenizer 36, the product is led further to a cooler 37, for example a plate heat exchanger, where it is cooled to the desired temperature. The product then leaves the plant through a conduit 38 for further treatment or to final filling and packing in consumer packages.

As will have been apparent from the foregoing description, the present invention realises an apparatus in an infusor 1 which assists in making it possible to admit steam 21 at a low level in the autoclave 2, without the steam flow 21 disrupting the fall of the product droplets 20 through the autoclave 2. Given that the steam inlet is placed in the lower region of the autoclave 2, there will also be created a "cold"

area 19 in the upper region of the autoclave 2, which assists in making it possible to evacuate the uncondensable gases 22 formed in the process, both simply and without unnecessary quantities of accompanying steam 21.

The present invention should not be considered as restricted to that described above and shown on the Drawings, many modifications being conceivable without departing from the scope of the appended claims.

What is claimed is:

1. An apparatus in an infusor (1) for a liquid food product, the apparatus being of the type which includes an autoclave (2) with an inlet (3) for the product located in its upper region, said inlet (3) being arranged to divide the product entering the autoclave (2) into small droplets (20), the infusor (1) further including an inlet (8) for steam located in the lower region of the autoclave (2) and also an outlet (13) located in the upper region for uncondensable gases (22), characterized in that the infusor (1) has at least one temperature gauge (15) placed in the upper region of the autoclave (2), said temperature gauge (15) being disposed, via a temperature regulator (16), to control an outlet valve (14) for the uncondensable gases (22).

2. The apparatus as claimed in claim 1, characterized in that the placing of the steam inlet (8) in the lower region of the autoclave (2) creates a "cold" area (19) in the upper region of the autoclave (2).

3. The apparatus as claimed in claim 1, characterized in that the temperature regulator (16) is given a norm value which exceeds the temperature of the incoming product in the autoclave (2) by a few degrees.

4. The apparatus as claimed in claim 1, characterized in that the autoclave (2) has, in its upper region, three temperature gauges (15, 17, 18), where one of the temperature gauges (17) is placed above the temperature gauge (15) and another of the temperature gauges (18) is placed beneath the temperature gauge (15); and that they are disposed such that the upper gauge (17) functions as a maximum temperature guard and that the lower gauge (18) functions as a minimum temperature guard.

* * * * *